Patented Nov. 12, 1946

2,410,865

UNITED STATES PATENT OFFICE 2,410,865

PLASTER COMPOUND

Haughton Brown, Milwaukee, Wis., assignor of fifty-five per cent to Daniel Taylor, Jr., and forty-five per cent to Viola Taylor, both of Milwaukee, Wis.

No Drawing. Application March 9, 1945,
Serial No. 581,947

2 Claims. (Cl. 106—109)

My invention refers to wall plaster and it is designed to provide an improved dry plaster compound, adapted to be distributed to the trade, and by simply adding a sufficient volume of water thereto, the same forms a plastic substance ready for use, which may be applied in the usual manner by a trowel, or a spray gun.

The primary object of my invention is to provide a plaster compound, which, due to its ingredients, may be applied to a cracked and painted wall, whereby it will form a smooth coating thereon, and will adhere to such wall when set. Thus, the plaster in a repair job provides a uniform new surface, and due to the speed in applying the same, a great reduction in the cost will result, bearing in mind that the original powdered compound is composed of inexpensive material.

It should also be understood that when a repair job requires a patch, the same can readily be made, and thereafter the complete space of the wall is coated with my new compound, as previously described.

With the above objects in view, my invention consists in what is herein shown and described, bearing in mind that the compound essentially embodies sand and gypsum, together with a small portion of dry grain powder, clay and paper pulp.

In producing, for example, one hundred pounds of my plaster compound, the same consists of dry mixing the following:

| | Pounds |
|---|---|
| Gypsum | 30 |
| Dry powdered wheat paste | 4 |
| Silica white sand | 60 |
| China clay | 4 |
| Dry paper pulp, preferably of the news print quality | 2 |

The above ingredients are thoroughly mixed.

When it is desired to use the compound, all that is required is to thoroughly mix said compound with a proper proportion of water to form a plastic, flowing mass, which mass may be applied to an ordinary plaster wall by a trowel, or it may be sprayed upon said wall by any form of blow gun, it being understood that the coating is of a sufficient thickness to thoroughly and smoothly cover all cracks, and the like, in the original wall, this thickness being, for example, ¼ in.

Under certain conditions, I may provide a suitable coloring matter to the mixed compound.

It will also be apparent that owing to the simplicity of the plaster compound and its application to a wall, the same may be readily applied as a repair coating by those unskilled in the art of plastering.

While I have specifically described my plaster compound as being used for repair jobs, it is manifest that the same may be efficiently applied to new walls.

Furthermore, while I have specifically described the proportionate ingredients contained in the compound, it is understood that I may vary such proportions as defined in the claims.

In some instances I may dispense with the clay.

I claim:

1. A plaster compound comprising 96 lbs., embodying a mixture of ingredients, approximately as follows: 60 lbs. silica white sand, 30 lbs. gypsum, 4 lbs. dry powder wheat paste, and 2 lbs. dry beaten paper pulp, all being thoroughly mixed.

2. A composition for wall plaster comprising 60 lbs. silica white sand, 30 lbs. gypsum, 4 lbs. dry powder wheat paste, 4 lbs. china clay, and 2 lbs. dry beaten paper pulp.

HAUGHTON BROWN.